Nov. 28, 1967    A. C. NOLTE, JR    3,355,153
STIRRING DEVICE
Filed Oct. 12, 1966
FIG. 1
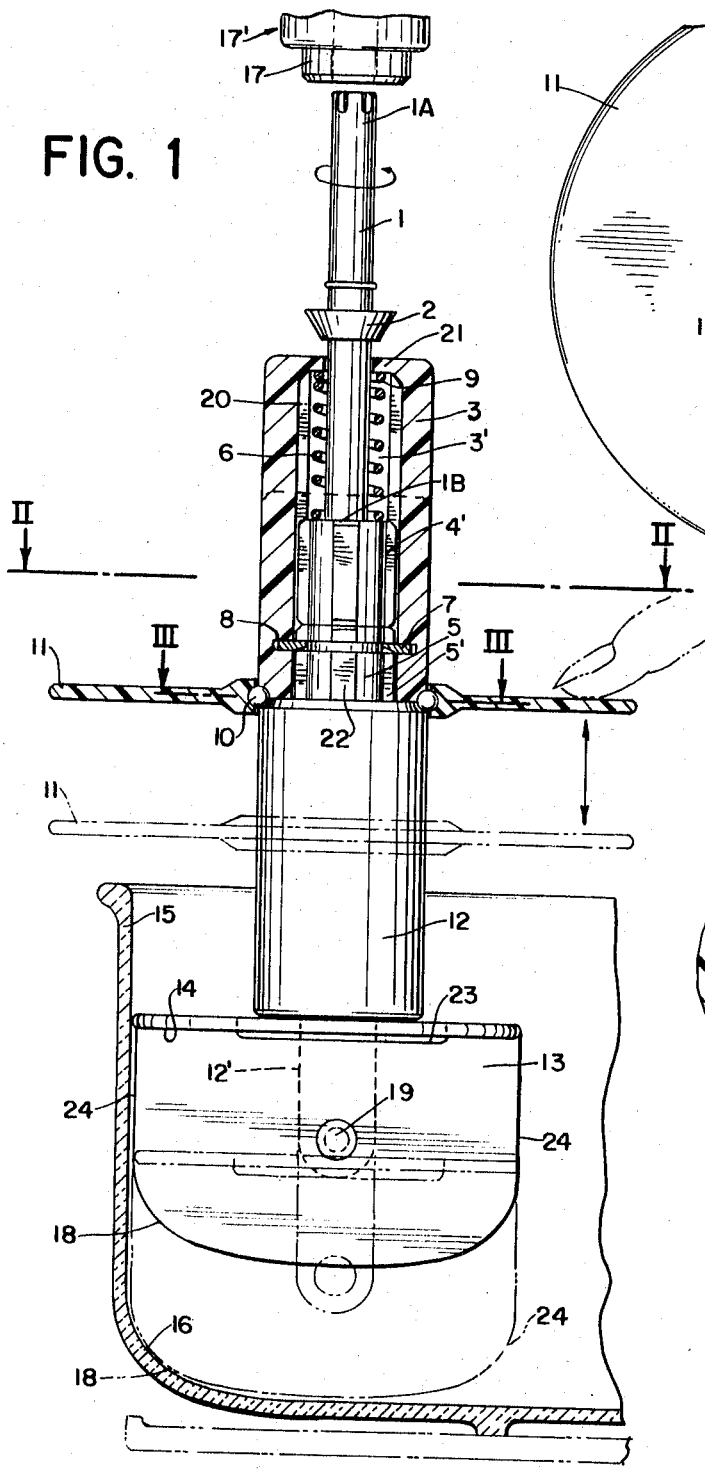
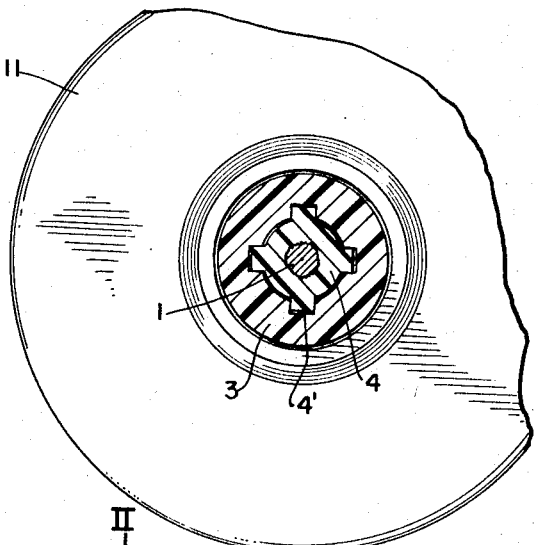
FIG. 2
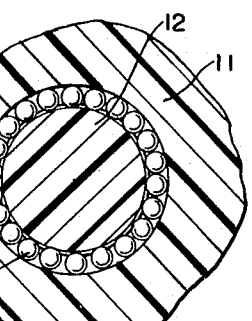
FIG. 3
INVENTOR.
ALBERT C. NOLTE, JR.
BY
*Nolte and Nolte*
ATTORNEYS United States Patent Office 3,355,153
Patented Nov. 28, 1967

3,355,153
STIRRING DEVICE
Albert C. Nolte, Jr., Oyster Bay, N.Y., assignor to Elton Industries, Inc., Oyster Bay Cove, N.Y., a corporation of New York
Filed Oct. 12, 1966, Ser. No. 586,239
6 Claims. (Cl. 259—111)

ABSTRACT OF THE DISCLOSURE

A rotatable blade assembly comprises a solid blade of substantially planar configuration having vertical sides joining the bottommost portion thereof in a predetermined contour. The blade has a very large surface area relative to the diameter of the bowl. The blade assembly is vertically moved to different positions in a bowl at different positions from the bottom of the bowl, including the bottommost portions of the bowl. The bowl has vertical sides and circumferential bottom, junction portions of a contour substantially identical with that of the blade.

---

The present invention relates to stirring devices and more particularly to devices adapted to thoroughly blend the separated constituents of liquid compositions, such as liquids used in the preparation of foods.

Although devices for this purpose are well known, they exhibit undesirable characteristics. Among these is the tendency not to thoroughly blend portions of the composition to be mixed, more noticeably at the bottom and at the inner corners of the containers of the liquid being mixed. Furthermore, known mixers exhibit a rotational movement which does not compensate for unmixed fluids at a level other than that of the mixing blade. Also in devices of the known type, there is a tendency for unmixed liquids to accumulate at the bottommost circumferential corners and edges of the mixing bowls so that the flow characteristics of more viscous compositions are unable to remove such unmixed portions from the corners and edges. In known devices, moreover, the blade configurations do not match or conform to the contours of these circumferential bottom corners and edges of the bowl, with the result that even when substantial mixing periods are allowed, unmixed constituents are present, after stirring.

It is an object of the present invention to provide improved stirring apparatus.

It is another object of the invention to provide an improved rotary-type mixer adapted to move longitudinally along its axis in pre-determined increments.

A further object of the invention is to provide a stirring device which combines a mixer and blade assembly, free to move in the longitudinal axial direction thereof, in combination with any one of a graduated set of bowls having an inner contour adapted to conform to the edge contour of the blade of the mixer.

A further object of the present invention is to provide a mixer and bowl combination in which the user can lower the mixing blade manually to a predetermined elevation in the mixing bowl.

A still further object of the present invention is to provide an improved stirring device as heretofore described having a pivotable blade in which elements thereof act in different directions in the liquid so as to provide a very thorough stirring and to exhibit splash-free stirring characteristics.

The present invention in one aspect fulfills the aforementioned objects and overcomes the limitations and disadvantages of prior art constructions by adapting and combining a driving rod which is axially fixed and which has pure rotary movement with a stirring blade shaft and blade assembly which is capable of axial movement.

In one embodiment of the present invention, the rotary driving rod projects downwardly from its point of support in a rotating receptacle of a driving unit such as that of a mixing appliance of known type, and terminates in a splined member fixed thereto for rotation therewith. A housing member, having a central chamber formed with axially extending internal slots therein which mate with the splines of the splined member, surrounds the latter and extends downwardly therefrom, the solid cylindrical lower portion of the housing member constituting essentially the stirring blade shaft. Thus, rotation of the rod also rotates the splined member which in turn produces rotation of the stirring blade shaft. A bias spring is maintained in compression inside said chamber between an internal upper shoulder of the housing member and the splined member, thereby resiliently urging the blade shaft upwardly toward the rotating receptacle. The housing member and blade shaft are thus supported indirectly by the driving rod by virtue of the suspension of the housing member at its upper shoulder atop the bias spring, which in turn is supported on the splined member secured to the driving rod. A depressible control plate is mounted by means of ball bearings on the housing member; and thus by manually depressing such relatively stationary plate the rotating stirring device may be manually lowered into a bowl and subsequently automatically lifted in the bowl by means of the spring. A collar fixed to the rod limits the extent of the return movement which the spring can give the device.

The stirring blade or vane configuration is such that the outer edge contour thereof is shaped to conform to the contour of the lower inner surface portions of the mixing bowls, said contour of the bowl being predetermined so as to avoid having portions of the mixing bowl which might otherwise contain unmixed constituents during the mixing or stirring process. An upper plate is fixed to the upper edge of the stirring vane and projects laterally beyond the opposed side faces thereof, so that this plate which rotates with the stirring vane will greatly minimize any tendency of the liquid being stirred to be splashed.

In no case does the volume of revolution of the blade occupy substantially the entire volume contained by each of said mixing bowls.

The stirring vane is pivotally mounted upon the stirring blade shaft so that it is free to move within its lateral plane in addition to rotating with the stirring blade shaft. This makes possible a more thorough mixing and contributes to the disruption of vortices which may be formed by pure rotational movement.

The invention will be more clearly understood from the following description of a specific embodiment thereof, together with the accompanying drawings, in which:

FIG. 1 is an elevational view of a stirring device and bowl constructed and arranged according to the invention, certain parts of the stirring device being shown in section;

FIG. 2 is a transverse cross-sectional view taken on the line II—II of FIG. 1; and FIG. 3 is a cross section taken on the line III—III of FIG. 1.

Referring now to the drawing, the stirring device of the present invention is adapted to have its upper end 1A connected to or fitted into the conventional rotating chuck or socket 17 of the driving receptacle 17' of a mixing appliance of known type (not shown in the FIGURES). At the lower end 1B of rod 1 a splined member 4 is suitably fixed for rotation therewith. A collar 2 is secured to the periphery of rotary rod 1 to serve as stop means, as will hereinafter be apparent. The appliance 17 may include an electric motor and a suitable gearing mechanism, all enclosed in the housing the bottom portion of which is shown.

A housing member 3, having a central cylindrical chamber 3' with axially extending slots 20 therein which mate with the splines 4' of the spline member 4 surrounds the latter and extends downwardly therefrom to become the stirring blade shaft 12. Accordingly, rotation of the rod rotates the spline member and the stirring blade shaft 12.

Rod 1 terminates at spline member 4, and a bias spring, here shown as a compression coil spring 6, surrounds that portion of rotary rod 1 which extends between spline member 4 and the inner bearing surface 9 of a shoulder 21 of the housing 3, said spring being seated on the annular top surface of the splined member 4 so as to urge the housing member 3 upwardly. A transverse annular groove 8 is formed in the inside portion of the side wall of the housing member 3 so as to hold a retaining ring 7 which frictionally grips and axially secures a splined member 5 to housing 3 when the present device is assembled.

The splines 5' of splined member 5 mate with the lower portions of the slots 20 in housing member 3. Splined member 5 has a diametrically extending slot so as to be keyed to a key portion 22 at the upper end of the blade shaft 12. Shaft 12 thus effects an extension of rotary rod 1, and shaft 12 together with housing 3 are disposed coaxially with respect to rotary rod 1. The upper edge of shaft 12 is so formed that a plate 11 may be mounted thereon by means of a ball bearings 10 at the bottommost edge of housing member 3, forming a releasibly rotatable connection therewith. This enables plate 11 to be retained in a non-rotating stationary position while rotary rod 1, housing 3 and shaft 12 are rotating due to the rotation of receptacle 17. It also enables the depressing plate 11 to be safely pressed downwardly while the shaft 12 rotates.

The upper surface of spline member 5 and the lower surface of spline member 4 are in an abutting relationship when plate 11 is not being depressed.

The cylindrical lower portion 12' of shaft 12 is of reduced diameter and is at the lower end of shaft 12, a blade or vane 13 is pivotally secured to the shaft by means of a pivot 19 which may take the form of a riveted connection. An upper plate 14 in the form of a circular disc is either integral with or fixed to the upper edge of vane 13 and is flat and located in a plane normal to the plane of vane 13. Vane 13 has a pair of opposed side faces and is substantially flat, being symmetrically arranged with respect to shaft 12. Furthermore, vane 13 is radially offset from the lower portion 12' of shaft 12 by being situated in a plane which is parallel to the axis of shaft 12 (FIG. 1). Vane 13 is convexly curved at its bottom edge, terminating in rounded corners 18.

An opening 23 in upper plate 14 provides clearance for shaft 12. Thus, vane 13 by means of pivot means 19 is able to move within its own plane as well as to rotate with shaft 12. The clearance provided between opening 23 and shaft 12 limits the amount of movement of vane 13 about pivot means 19 in a predetermined amount.

A bowl 15 is shown in FIG. 1 wherein the inside bottom corners and bottom edge are contoured in a predetermined shape so that curved edge 18 of vane 13 will substantially mate with curved portion 16 of bowl 15. In addition, the sides 24 of vane 13 will "hug" the inner sides of bowl 15 while surfaces 16 and 18 are in a mating position. Hence, the volume of revolution of vane 13 and upper plate 14 will substantially fill the volume enclosed by a side, bottom corner and edge, and bottom of bowl 15 when the present invention is being used, thereby avoiding having portions within bowl 15 in which unmixed constituents of the liquid being stirred can settle. In none of the embodiments covered by the present invention does the volume of revolution of vane 13 substantially fill the volume defined by all of the inner surfaces of bowl 15, and thus at a particular instant only one vertical side, the bottommost portion and the joining edge contour of blade 13 will engage the inner contour of bowl 15 in mating cooperation therewith when any vertical side of bowl 15 is in contact with a vertical side of blade 13.

While only one bowl 15 has been shown in FIG. 1, a plurality of bowls are intended to be used, forming a set, each having a different predetermined capacity and each being contoured in a predetermined manner such that vane 13 will substantially mate with the inner contours thereof. The dotted outline of vane 13 shown in FIG. 1 illustrates the extent to which blade 13 may penetrate the bottom corners and edges of a bowl such as bowl 15.

In other embodiments of the present invention (not shown), vertical and horizontal movement of the bowl can accomplish the same results.

The present device is adapted to be used as either a conventional type mixer, in that plate 11 is omitted and no movement along the axis of rod 1 is effectuated, or plate 11 may preferably be utilized to give the device vertical motion and positioning in addition to its rotary movement. By pressing down with the finger or other object on plate 11, housing 3 is caused to slide past splined member 4, thereby compressing spring 6 and lowering vane 13 from the position shown in full lines in FIG. 1 to the position shown by the dotted outline of vane 13. The user of the present invention is able to maintain vane 13 in any position between these points for any length of time, thereby having manual control of the mixing characteristics of the present device. Upon release of the pressure on plate 11, spring 6 will cause housing 3 to return to the position shown in full lines in FIG. 1. The present device is adapted to be used with bowls of varying depths. In addition, containers may be used which have other than straight sides or which have undercuts and plateaus.

Upper plate 14 will prevent splashing of the liquid being stirred by intercepting currents which might tend to be transmitted through the liquid up to the surface thereof so as to cause splashing. Nevertheless the rotation of vane 13 will provide a thorough stirring of the liquid as aided by its pivotal as well as rotational movement.

The present stirring device is of an exceedingly simple construction and is very light in weight, facilitating cleaning and care. Blade shaft 12 may be made detachable if desired, thereby enabling the user of the invention to detach a portion of the shaft 12 from vane 13 and for cleaning manually or in a household dishwasher.

Because of the ball bearing configuration shown in FIG. 3, plate 11, which is constructed with smooth exposed surfaces and having no sharp edges, is easily stopped from rotating whenever the user desires to depress plate 11 so as to depress the blade. Thus, the present device is perfectly safe and easy to use. In addition, due to the spline arrangement shown in FIG. 2, housing member 3 will slide very easily along spline 4 when the respective teeth are in a mating condition, and thus very little effort on the part of the user is required to accomplish the results heretofore described.

The embodiment of the invention particularly disclosed herein is presented hereby as an example of how the invention may be applied. Other embodiments, forms, and modifications of the invention, coming within the scope of the appended claims, will of course readily suggest themselves to those skilled in the art.

What is claimed is:

1. Apparatus for stirring, comprising, in combination, at least one bowl having a wall and a circumferential bottom junction portion of a predetermined contour, a rotatable blade assembly comprising a solid blade of substantially planar configuration having sides joining the bottommost portion thereof in a predetermined contour substantially identical with the contour of said bowl and having a large surface area relative to the projected cross-sectional area of said bowl, and means for vertically moving said blade assembly to different positions in the bowl, at least one of said portions including a bottommost portion of said bowl.

2. Apparatus for stirring, comprising, in combination, at least one bowl having a wall and a circumferential bottom junction portion of a predetermined contour, a rotatable solid blade of substantially planar configuration assembly comprising a blade having sides of a predetermined contour substantially identical with the contour of said bowl and having a large surface area relative to the projected cross-sectional area of said bowl and adapted to matingly rotate in a minor portion of the inside of said bowl, and means for moving said blade assembly to different positions in the bowl, at least one of said positions including a bottommost portion of said bowl.

3. A device for stirring a liquid comprising a bowl of determined side and bottom contour, a rotatable driving shaft, a solid stirring vane of substantially planar configuration mounted on the lower end portion of said shaft and having opposing substantially flat faces and having side edges the major portion of which lie in downwardly extending rectilinear planes, and a convexly curved bottom edge extending substantially from one to the other of the sides of said vane and having a very large surface area relative to the diameter of said bowl, the side and bottom edges of said vane having a contour substantially identical with the contour of said bowl, a disc surrounding said shaft above said vane, the periphery of said disc being radially spaced from the axis of said shaft at least as far as is each outer edge of said vane, and means for axially shifting said vane with respect to said shaft.

4. The device according to claim 3 wherein said disc is formed with an opening through which said shaft passes, said opening being larger than the cross-sectional area of said shaft, said shaft extending with clearance through said opening and providing a free pivotal movement of said vane and said disc with respect to said shaft.

5. In a method for stirring, the steps of: rotating a splined rod and blade assembly, subsequently moving said blade assembly axially with respect to said rod from a predetermined first position to a predetermined second position, bringing the contour of a rotating blade adjacent the curvature of an inner bottom surface of a bowl containing matter to be stirred, stirring the contents at and adjacent to the bottommost portion of said bowl, returning said blade assembly to said first position, and stirring other parts of the contents of said bowl.

6. A device for stirring utilizing at least one bowl of predetermined contour, comprising in combination, a rotary rod adapted to be rotatively driven by the driving unit of a mixing appliance; a cylindrical housing member having a central chamber which receives coaxially a portion of said rotary rod and comprising an inner surface portion spaced from said rotary rod and extending coaxially therewith, an outer surface portion extending coaxially with respect to said inner surface and having an upper portion and a lower portion, shoulder means for slidably cooperating with said rotary rod and having a bearing surface disposed in a plane substantially perpendicular to the longitudinal axis of said chamber and forming an integral portion of said inner surface, toothed receptacle means for slidably mating with the teeth of a spline, said receptacle means being disposed axially in said inner surface, a retaining ring, said housing having groove means formed therein for accepting a portion of said retaining ring, said groove means being disposed in said inner surface, means for cooperating with bearing means and being disposed in said lower portion of said outer surface; a first spline member secured to the housed end of said rotary rod and having teeth which slidably mate with said toothed receptacle means, said first spline having an upper bearing surface and a lower bearing surface; spring means disposed around said portion of the rotary rod within said housing and biased against the bearing surface in said housing and the upper bearing surface of said first spline; a shaft, comprising a cylindrical body portion having an upper keyed portion and an upper shoulder portion, said shoulder portion abutting said housing when in an operating position, a second spline member secured to said keyed portion and having teeth which slidably mate with said toothed receptacle means, said second spline having an upper bearing surface abutting the lower bearing surface of said first spline member, said second spline member having a groove for accepting a portion of said retaining ring, said retaining ring securing said second spline to said housing; a substantially flat stirring vane pivotally mounted at the lower end of said shaft and having a bottom edge of a predetermined curvature laterally extending from the lower end of said shaft; a disc surrounding said shaft above said vane, the periphery of said disc extending at least to the outer edges of said vane; a bowl of a predetermined size having inner bottom corners, said corners having a predetermined concave contour for mating cooperation with the predetermined curvature of said vane; a depressor plate having means for slidably moving said housing axially along said rotary rod and compressing said spring; and a ball bearing disposed intermediate said depressor plate and said housing and secured to said depressor plate and said housing.

References Cited
UNITED STATES PATENTS

| | | | |
|---|---|---|---|
| 1,040,427 | 10/1912 | Savage | 259—108 |
| 2,584,887 | 2/1952 | Laurence | 259—102 |
| 2,616,673 | 11/1952 | Guilder | 259—102 |
| 2,616,674 | 11/1952 | Polivka et al. | 259—102 |
| 2,962,268 | 11/1960 | Soltermann | 259—102 |
| 3,207,489 | 9/1965 | Berman | 259—107 |

WALTER A. SCHEEL, *Primary Examiner.*

ROBERT W. JENKINS, *Examiner.*

UNITED STATES PATENT OFFICE

CERTIFICATE OF CORRECTION

Patent No. 3,355,153                           November 28, 1967

Albert C. Nolte, Jr.

It is hereby certified that error appears in the above numbered patent requiring correction and that the said Letters Patent should read as corrected below.

Column 5, line 1, for "portions" read -- positions --; lines 6 and 7, strike out "assembly" and insert the same after "blade" in line 6, same column 5.

Signed and sealed this 17th day of December 1968.

(SEAL)
Attest:

Edward M. Fletcher, Jr.                       EDWARD J. BRENNER
Attesting Officer                             Commissioner of Patents